United States Patent
Steinbusch

(10) Patent No.: US 7,444,491 B1
(45) Date of Patent: Oct. 28, 2008

(54) AUTOMATIC RESOURCE SHARING BETWEEN FIFOS

(75) Inventor: Otto L. Steinbusch, Mountain View, CA (US)

(73) Assignee: nVIDIA Corporation, Santa Clara, CA (US)

( * ) Notice: Subject to any disclaimer, the term of this patent is extended or adjusted under 35 U.S.C. 154(b) by 248 days.

(21) Appl. No.: 11/295,940

(22) Filed: Dec. 6, 2005

(51) Int. Cl.
*G06F 12/00* (2006.01)
(52) U.S. Cl. ............... 711/170; 711/171; 711/172
(58) Field of Classification Search ............... None See application file for complete search history.

(56) References Cited

U.S. PATENT DOCUMENTS 6,678,813 B1 * 1/2004 Le ........................... 711/172
7,176,928 B1 * 2/2007 Sendrovitz ................. 345/534

* cited by examiner

*Primary Examiner*—Reginald G. Bragdon
*Assistant Examiner*—Ngoc V Dinh

(57) ABSTRACT

Embodiments of the present invention recite a method and system for allocating memory resources. In one embodiment, a control component coupled with a memory device determines that a data buffer adjacent to a boundary of a first FIFO queue does not contain current data. The control component also determines that a second data buffer of a second FIFO queue adjacent to the boundary does not contain current data. The control component then automatically shifts the boundary to include the second data buffer in the first FIFO queue.

27 Claims, 12 Drawing Sheets

AUTOMATIC RESOURCE SHARING BETWEEN FIFOS

FIELD OF THE INVENTION

Embodiments of the present invention are related to the field of resource allocation in memory devices.

BACKGROUND OF THE INVENTION

In many current electronic devices, a discrete portion of main memory may be allocated to each of the programs running on the device. FIG. 1 shows one implementation of an exemplary prior art shared memory space 100. In FIG. 1 memory space 100 comprises a plurality of memory buffers (e.g., buffer 0-buffer 20) which are grouped to form 2 first-in first-out (FIFO) data queues, FIFO 0 and FIFO 1 are adjacent to and separated by a static boundary 1 (e.g., 130) which is indexed at a value of 10. Also shown in FIG. 1 is a static boundary 2 (e.g., 131) which separates FIFO 1 from the next adjoining FIFO and which is indexed at a value of 20. Also shown in FIG. 1 are a read pointer 0 (RP0) 111 which indicates that the next buffer in FIFO 0 into which data will be accessed, and a write pointer 0 (WP0) 112 which indicates the next buffer in FIFO 0 from which data will be stored. Similarly, FIFO comprises a RP1 121 and WP 122 which perform the same function for FIFO 1.

The operation of FIFO queues, also referred to as "circular buffers," is well known in the art. When the write pointer for a FIFO queue has incremented to the highest value for the queue (e.g., 9 for FIFO 0), it returns to the lowest index value for the subsequent write operation. As shown in FIG. 1, WP0 (112) has incremented to 9 and then returned to 0 and 1 for subsequent write operations, thus indicating that buffer 1 will be the next data buffer to which data will be written. However, RP0 is indexed at 8 indicating that the data in buffers 8, 9, and 0 have not been read from and still contain current data. This phenomenon is referred to as "wrapping" as the data has been wrapped from the highest data buffer in the queue back around the lowest.

In FIFO 1, both RP1 (121) and WP1 (122) point to the same data buffer, data buffer 13. This can mean that FIFO 1 is either empty or full, depending upon which operation was last performed in FIFO 1. For example, if the last operation performed in FIFO 1 was a read operation, it would indicate that all of the current data stored in FIFO 1 was read before additional data was stored. If the last operation performed in FIFO 1 was a write operation, it would indicated that WP1 (122) has wrapped around as shown in FIG. 1. Typically, a subsequent write to FIFO 1 would be denied as it would over-write the data in buffer 13 that has not yet been accessed.

If an application is denied a write operation, it can adversely affect the performance of the currently running application when the FIFO acts as a bottleneck. To minimize the danger of this happening, FIFO queues are typically allotted an amount of space that would prevent a "worst case scenario" to avoid the bottleneck situation. However, oversizing the FIFO queues in this manner wastes memory space which might be more productively allocated to the currently running application. Additionally, as more functionality is built into devices and chip designers strive to ensure that no client is denied access to data, the number of FIFO queues on the chip is proliferating, thus consuming even more memory space and power.

SUMMARY OF THE INVENTION

Accordingly, a need exists to enable dynamic re-allocation of physical buffer space of an electronic device as applications need the memory (e.g., from a de-selected software application to a currently running application). While meeting the above stated need, it would also be advantageous to perform the dynamic re-allocation in a manner that is transparent to the user. What is needed is a dynamic re-allocation system that would efficiently share memory resources across multiple clients that share the FIFO space.

Embodiments of the present invention recite a method and system for allocating memory resources of a memory having multiple FIFO memories. In one embodiment, a control component coupled with a memory device determines that a data buffer adjacent to a boundary of a first FIFO queue does not contain current data. The control component also determines that a second data buffer of a second FIFO queue adjacent to the boundary does not contain current data. The control component then automatically shifts the boundary to include the second data buffer in the first FIFO queue. The operation of the control component may be initiated in response to the first FIFO filling up periodically more than the second FIFO, thereby causing the dynamic re-allocation of memory as described above.

In operation, a control component periodically monitors the number of write operations a FIFO queue denies (e.g., FIFO full) using a counter associated with that FIFO queue. If the number of write denials exceeds a parameter, a signal is generated to initiate a determination for re-allocation of memory resources between FIFO queues. In embodiments of the present invention, a virtual border that separates the FIFO queue from an adjacent FIFO queue may be shifted to make additional data buffers available to the FIFO queue that is denying write operations. Embodiments of the present invention include rules or guidelines for determining whether shifting the virtual border is appropriate at a given time. Specific conditions are outlined for shifting the boundary up and other conditions for shifting the boundary down. For example, embodiments of the present invention determine whether shifting the virtual border will render data in one or more of the FIFO queues inaccessible or adversely affect the synchronization of writing to and reading from the FIFO queues.

Furthermore, in embodiments of the present invention, the control component can automatically change the polling interval of the counters associated with the FIFO queues. For example, in one embodiment, if a counter associated with one of the FIFO queues saturates, the control component can reduce the number of clock cycles between polling events. This facilitates a more precise monitoring of the number of times a FIFO queue may be denying a write operation to an application. Embodiments of the present invention may be implemented in software, or in hardware.

By allocating more memory to a FIFO that is filling periodically, the embodiments of the present invention provide for increased memory efficiency while being transparent to the clients that share the memory. Embodiments of the present invention advantageously reduce system back-pressure by dynamically resizing FIFO sizes in response to real-time memory usage as periodically monitored.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "shifting," "using," "generating," "resetting," "receiving," "accessing," "comparing," "creating," "incrementing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2A:
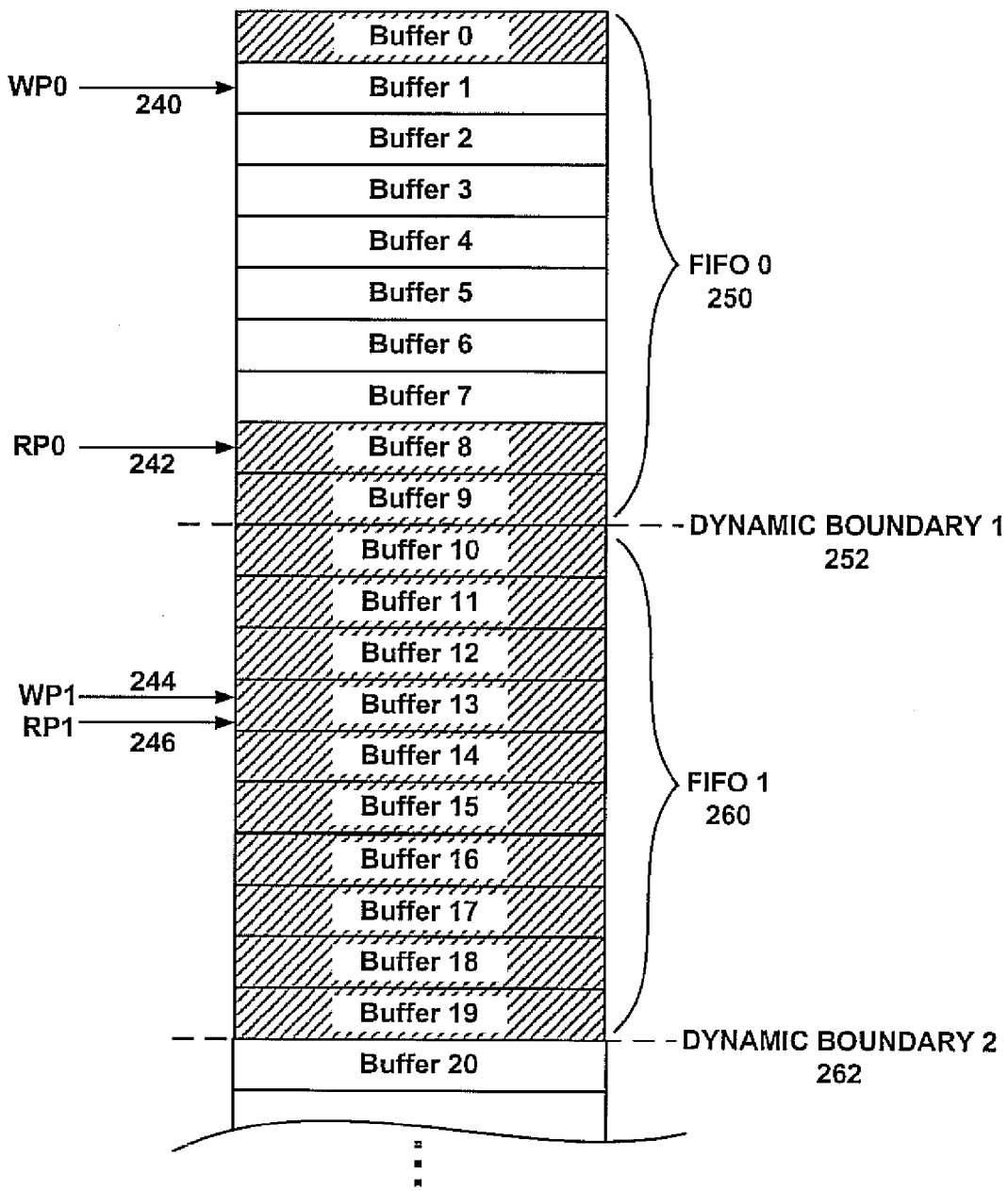
FIG. 2A illustrates memory allocation for multiple FIFOs having dynamic virtual boundaries in accordance with embodiments of the present invention.

FIG. 2A shows one implementation of an exemplary shared memory space 270 in accordance with embodiments of the present invention. In FIG. 2A memory space 270 comprises a plurality of memory buffers (e.g., buffer 0-buffer 20) which are grouped to form 2 first-in first-out (FIFO) data queues, FIFO 0 and FIFO 1 (e.g., 250 and 260 respectively). As shown in FIG. 2A, FIFO 0 and FIFO 1 are adjacent to and separated by a dynamic boundary 1 (e.g., 252) which is indexed at a value of 10. Also shown in FIG. 2A is a dynamic boundary 1 (e.g., 262) which separates FIFO 1 from the next adjoining FIFO and which is indexed at a value of 20. Also shown in FIG. 2A are a read pointer 0 (RP0) 242 which indicates the next buffer in FIFO 0 into which data will be accessed, and a write pointer 0 (WP0) 240 which indicates the next buffer in FIFO 0 from which data will be stored. Similarly, FIFO comprises a RP1 246 and WP 244 which perform the same function for FIFO 1.

In FIFO 1, both RP1 (246) and WP1 (244) point to the same data buffer, data buffer 13. This can mean that FIFO 1 is either empty or full, depending upon which operation was last performed in FIFO 1. For example, if the last operation performed in FIFO 1 was a read operation, it would indicate that all of the current data stored in FIFO 1 was read before additional data was stored. If the last operation performed in FIFO 1 was a write operation, it would indicate that WP1 (244) has wrapped around as shown in FIG. 2A. Typically, a subsequent write to FIFO 1 would be denied as it would over-write the data in buffer 13 that has not yet been accessed.

Figure 1:
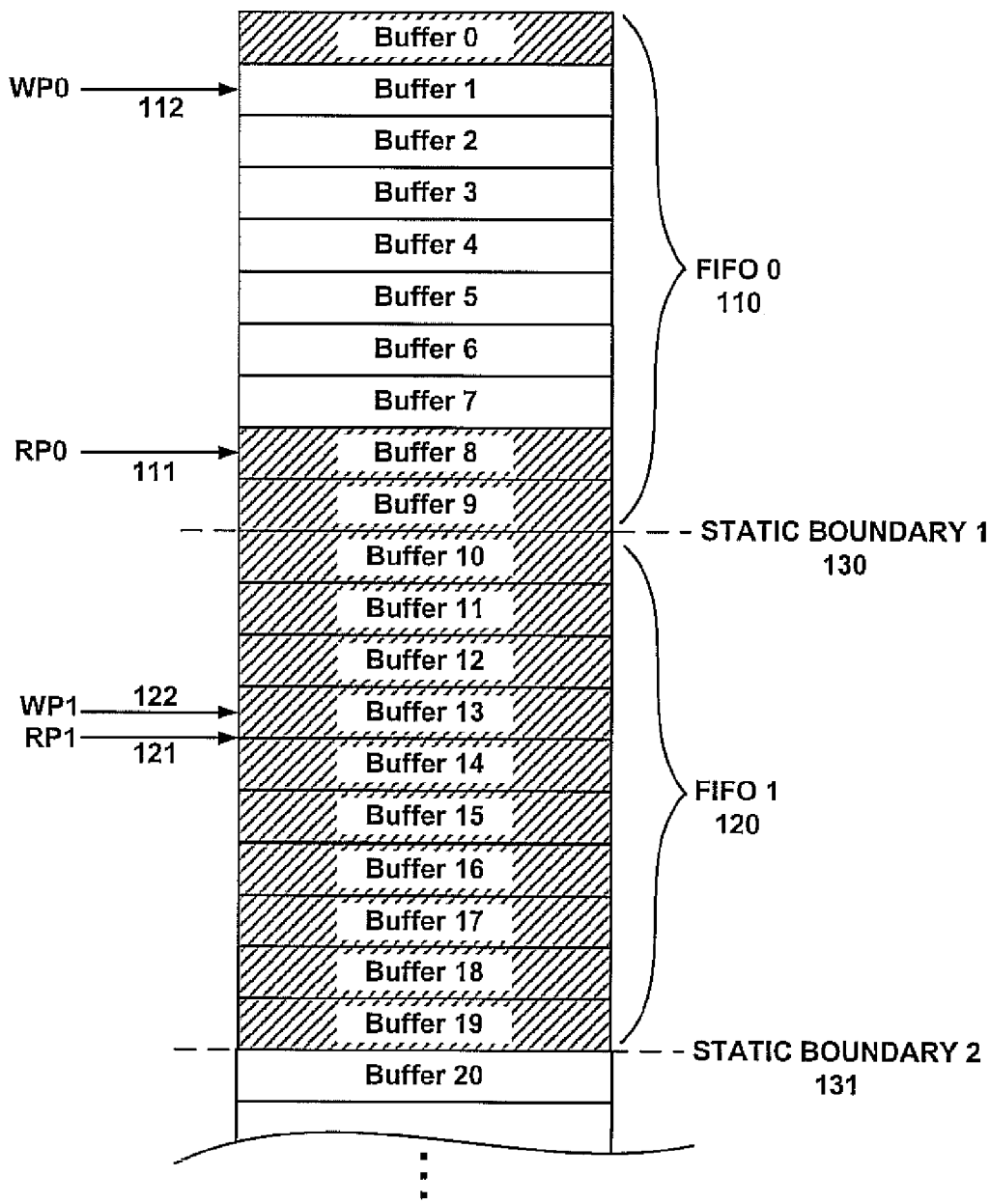
FIG. 1 shows an exemplary prior art allocation of first-in first-out (FIFO) memories.

In contrast to the conventional shared memory space of FIG. 1, the boundaries between the FIFO queues of shared memory space 270 can be dynamically shifted to allocate additional memory buffers to FIFO queues that require space. In an exemplary operation, a control component coupled with shared memory space 270 periodically monitors the number of write operations that each FIFO queue denies (e.g., FIFO full) using a respective counter associated with each FIFO queue. If the number of write denials exceeds a parameter, the control component generates a signal to initiate a re-allocation routine which will increase the size of FIFO that is denying an excessive number of write denials. Furthermore, in embodiments of the present invention, the control component can automatically change the polling interval of the counters associated with the FIFO queues. For example, in one embodiment, if a counter associated with one of the FIFO queues saturates, the control component can reduce the number of clock cycles between polling events. This facilitates a more precise monitoring of the number of times a FIFO queue may be denying a write operation to an application.

In embodiments of the present invention, the re-allocation routine includes rules or guidelines for determining whether shifting the virtual border is appropriate at a given time. For example, the re-allocation routine may first determine whether shifting the virtual border will render data in one or more of the adjacent FIFO queues inaccessible or adversely affect the synchronization of writing to and reading from the FIFO queues. In embodiments of the present invention, a control component coupled with shared memory space 270 may determine that a data buffer adjacent to a boundary of a first FIFO queue does not contain current data. The control component also determines that a second data buffer of a second FIFO queue adjacent to the boundary does not contain current data. The control component then automatically shifts the boundary to include the second data buffer in the first FIFO queue. The operation of the control component may be initiated in response to the first FIFO filling up periodically more than the second FIFO, thereby causing the dynamic re-allocation of memory as described above.

By allocating more memory to a FIFO that is filling periodically, the embodiments of the present invention provide for increased memory efficiency while being transparent to the clients that share the memory. Embodiments of the present invention advantageously reduce system back-pressure by dynamically resizing FIFO sizes in response to real-time memory usage as periodically monitored.

Figure 2B:
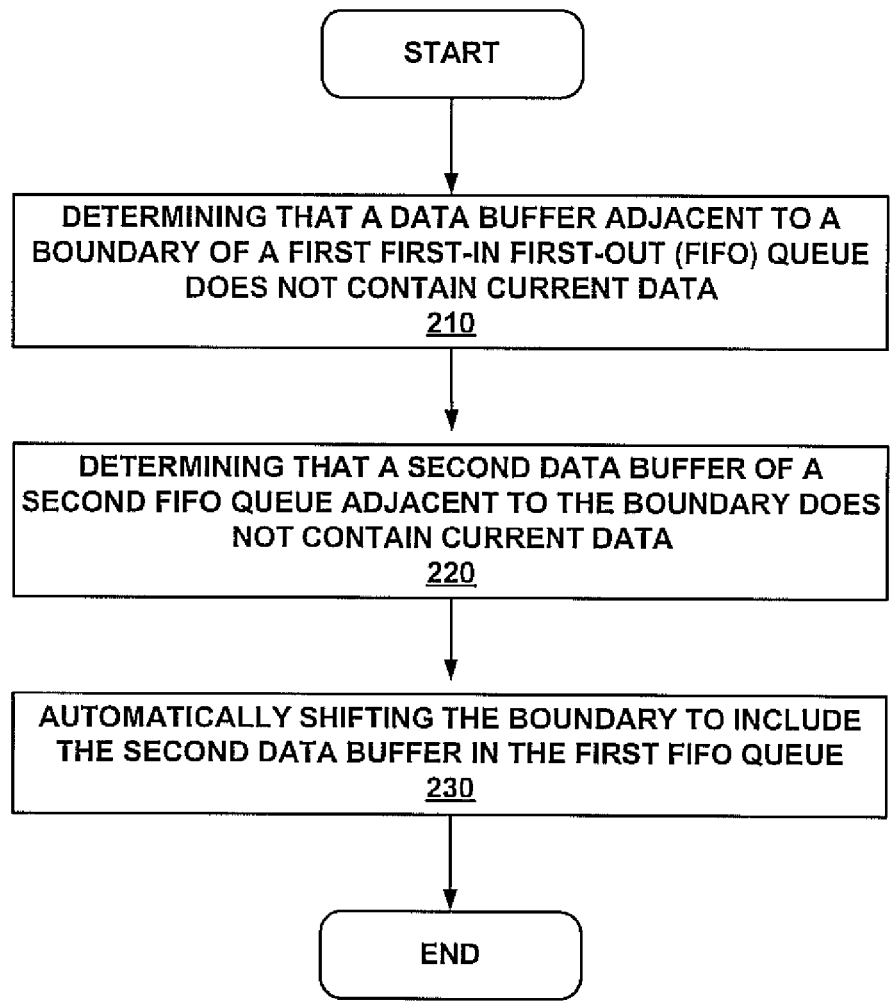
FIG. 2B is a flowchart of an exemplary method for automatically allocating memory resources accordance with embodiments of the present invention.

FIG. 2B is a flowchart of an exemplary method 200 for automatically allocating memory resources in accordance with embodiments of the present invention. In step 210 of FIG. 2B, it is determined that a data buffer (e.g., buffer 9) adjacent to a virtual boundary 252 of a first-in first-out (FIFO) queue 250 does not contain current data. In embodiments of the present invention, if a data buffer adjacent to a virtual boundary between two FIFO queues contains current data, it may indicate that the FIFO is wrapping. If the virtual boundary 252 is moved up (e.g., the index of the virtual boundary is decremented), the data in that buffer may be lost. Alternatively, if the virtual boundary 252 is moved down (e.g., the index of the virtual boundary is incremented), an empty data buffer will be inserted into the FIFO queue which may place the reading and writing of that FIFO queue out of synchronization.

In step 220 of FIG. 2B, it is determined that a second data buffer (e.g., buffer 10) of a second FIFO queue 260 adjacent to the virtual boundary 252 does not contain current data. As described above, if the second data buffer (e.g., buffer 10) of the second FIFO queue 260 contains current data, moving the virtual boundary 252 may place the reading and writing of the second FIFO queue 260 out of synchronization, or may render the data in that data buffer inaccessible to the second FIFO queue 260.

In step 230 of FIG. 2B, the virtual boundary 252 between the FIFO queue 250 and the second FIFO queue 260 is automatically shifted to include the second data buffer (e.g., buffer 10) in the FIFO queue 250. Upon determining that the data buffers in both FIFO queues adjacent to the virtual boundary are empty, embodiments of the present invention automatically shift the virtual boundary so that the second data buffer of the second FIFO queue is included in the first FIFO queue after the virtual boundary has been shifted. In embodiments of the present invention, the virtual boundary may be shifted up (e.g., decrementing the index of the virtual boundary), or may be shifted down (e.g., incrementing the index of the virtual boundary). It is noted that while the present embodiment recites shifting the virtual boundary by one data buffer, embodiments of the present invention are not limited to shifting the virtual boundary by one buffer alone. More generally, embodiments of the present invention may shift the virtual boundary between FIFO queues by N data buffers as long as current data in either of the buffers is not lost and the synchronization of reading and writing in both of the buffers is not adversely affected.

It is appreciated that process 200 may be called periodically and may be invoked in response to a determination that one FIFO is being filled more often than the adjacent FIFO, thereby causing the need to have one FIFO grow larger with respect to the other.

As will be described in greater detail below, embodiments of the present invention facilitate automatic hardware-implemented monitoring and allocation of memory resources to currently running applications. As a result, embodiments of the present invention utilize less memory space than conventional software implemented memory management software applications and may exhibit greater responsiveness to changes in memory allocation requirements. Embodiments of the present invention are advantageous in situations in which mutually exclusive applications may be competing for limited memory space. For example, a graphics application and a video conferencing application are unlikely to be running concurrently on a user's system. Thus, a static allocation of memory resources may deprive memory from the currently running application while allotting memory to the non-currently running application which it does not need.

In contrast, embodiments of the present invention automatically determine whether the currently running application needs more memory and dynamically allocates those resources. Thus, the FIFOs can be automatically resized according to their real-time use, rather than a static allocation of resources. As a result, embodiments of the present invention can save on the total buffer area used which also results in reduced power consumption, or use the available area more efficiently. Additionally, this can be done in a manner that is transparent to the user.

Figure 3:
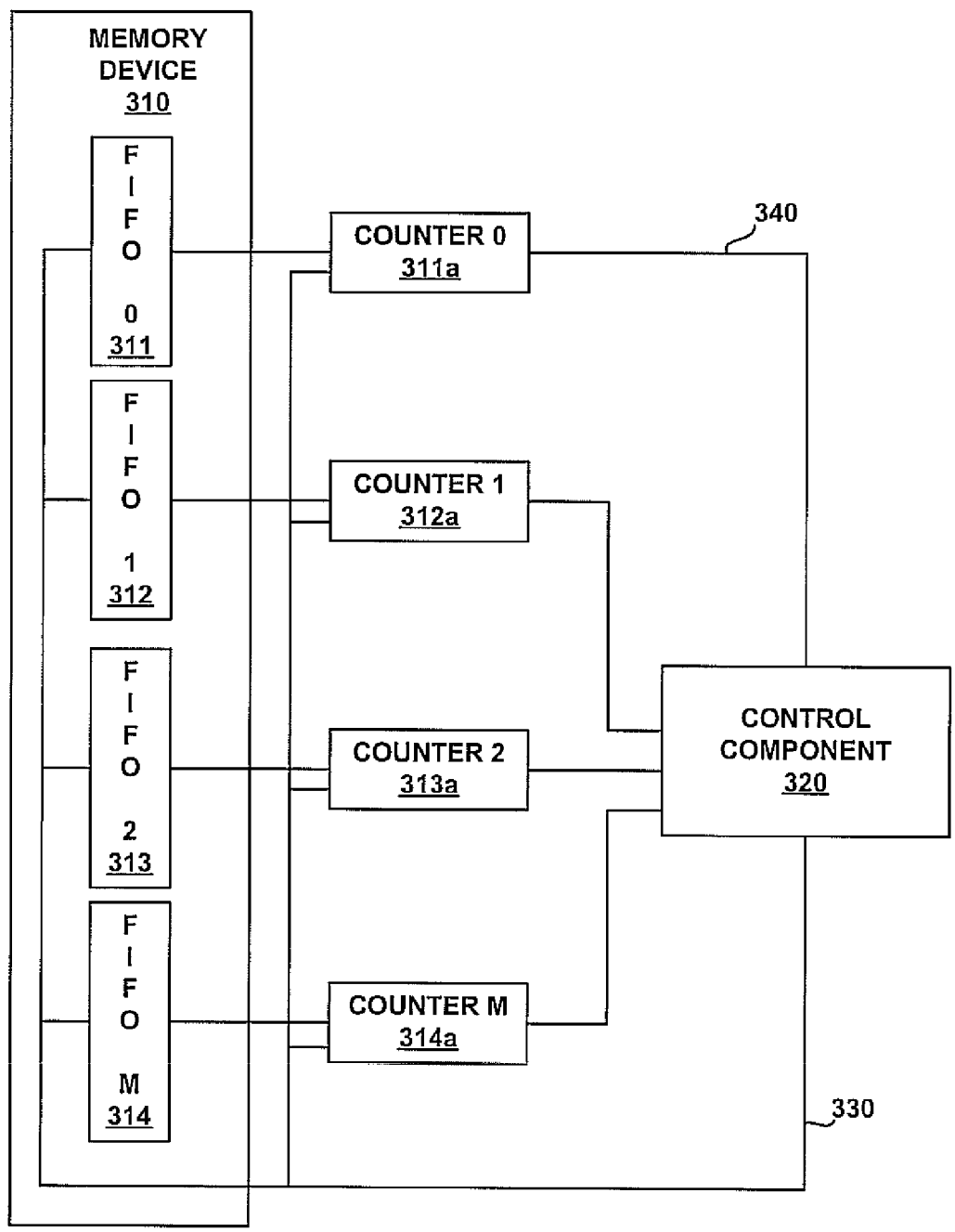
FIG. 3 shows a system for automatically allocating memory resources in accordance with embodiments of the present invention.

FIG. 3 shows a system 300 for allocating memory resources in accordance with embodiments of the present invention. In the embodiment of FIG. 3, system 300 comprises a memory device 310 which is coupled with a control component 320 via a signal bus 330. In embodiments of the present invention, memory device 310 comprises a plurality of FIFO queues FIFO 0, FIFO 1, FIFO 2, FIFO M (e.g., 311, 312, 313, and 314 respectively). Each of the FIFO queues is coupled with a corresponding counters (e.g., 311a, 312a, 313a, and 314a). It is noted that counters 311a, 312a, 313a, and 314a may comprise a separate component as shown in FIG. 3, reside in control component 320, or memory device 310. Additionally, in embodiments of the present invention, counters 311a, 312a, 313a, and 314a may be saturating counters. This means that after reaching the maximum value that the counters are capable of recording, counters 311a, 312a, 313a, and 314a retain this maximum value rather than re-cycling to zero. This facilitates determining whether a given FIFO queue is denying write operations often, or just occasionally. In embodiments of the present invention, the data buffers comprising the FIFO queues comprise, but are not limited to, a plurality of flip-flops. In another embodiment, memory device 310 may comprise a static random-access memory (SRAM) device if dedicated read and write ports are provided for each of the FIFO queues.

It is noted that while represented in FIG. 3 as spatially separate entities, in embodiments of the present invention, the FIFO queues in memory device 310 are typically contiguous. Additionally, it is appreciated that the data buffers comprising each of the FIFO queues are typically the same width (e.g., each buffer is 200 bytes wide). In embodiments of the present invention, signal bus 330 also couples each of the counters with control component 320.

In embodiments of the present invention, each counter is incremented when an attempt to write data to the corresponding FIFO queue is denied (e.g., due to the FIFO queue being full). Thus, if an application attempts to write to FIFO 0 (e.g., 311) and is denied because FIFO 0 is already full, counter 0

(e.g., 311a) will be incremented. In embodiments of the present invention, control component 320 accesses the counters at pre-determined time and programmable intervals to determine whether a given FIFO queue may require additional space to prevent write denials. The pre-determined time interval may be a default parameter, a user-specified and programmable parameter, or may be automatically adjusted by, for example, control component 320.

In embodiments of the present invention, control component 320 may automatically adjust the time parameter for accessing one or more of the counters. For example, if control component 320 determines that counter 0 (e.g., 311a) reaches its maximum or saturation value one or more times, control component 320 may automatically decrease the time interval for accessing counter 0. In so doing, write denials by FIFO 0 may be prevented by adjusting virtual boundary 1 (e.g., 410) before FIFO 0 actually becomes filled.

In embodiments of the present invention, control component 320 compares the value stored by each counter with a stored parameter. If the value stored by the counter is equal to, or greater than, the stored parameter, control component 320 generates a signal to initiate re-allocating memory resources of memory device 310. More specifically, one or more virtual boundaries of the FIFO queue which is reporting full may be shifted to allocate more data buffers to that FIFO queue. While the present embodiment discloses that control component 320 compares the counter of one FIFO queue to determine whether shifting the virtual boundary is desirable, embodiments of the present invention may compare the counters of adjoining FIFO queues as well to determine whether shifting common virtual boundaries is appropriate.

Figure 4A:
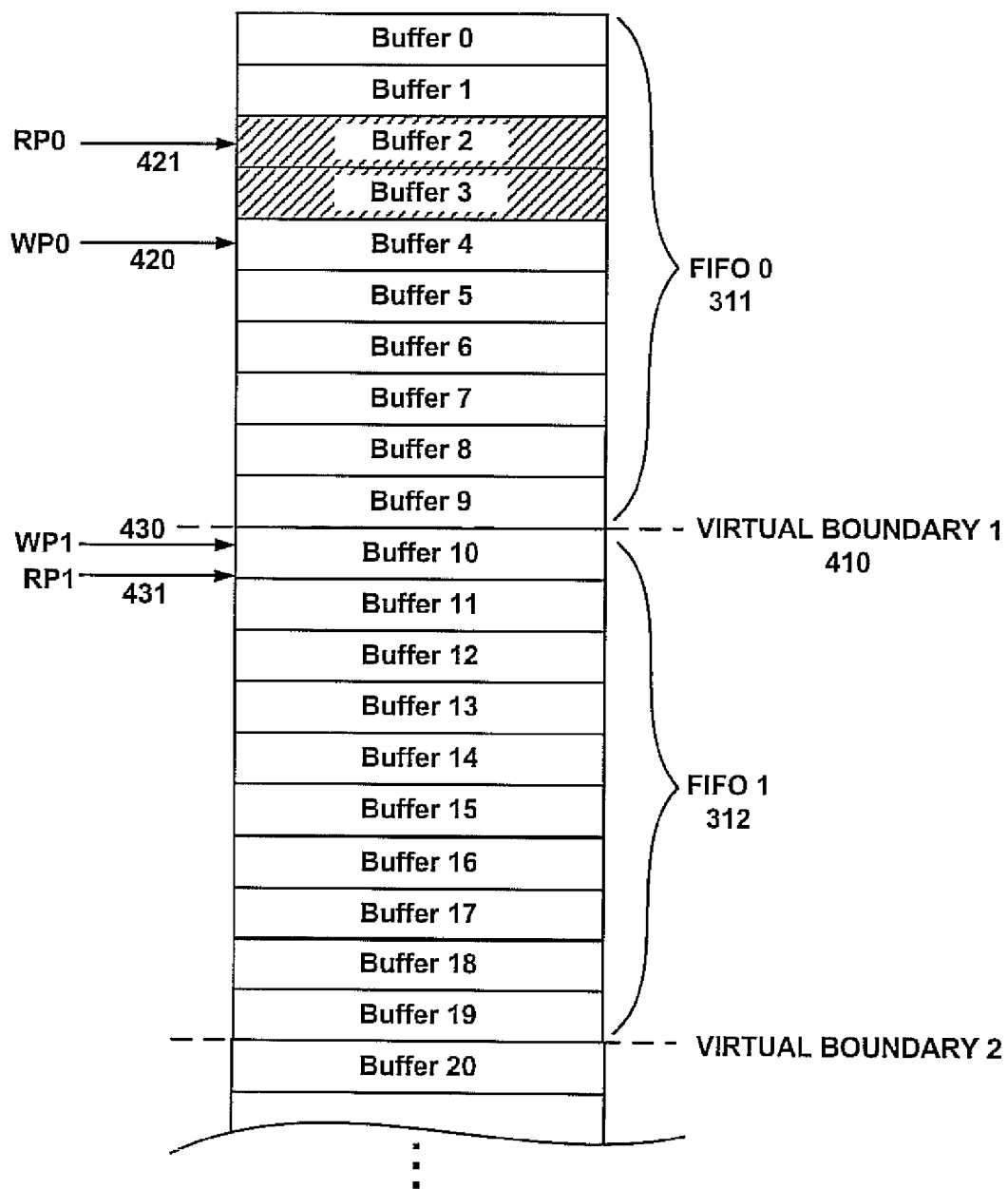
FIGS. 4A and 4B show the allocation of memory resources of an exemplary FIFO memory in accordance with embodiments of the present invention.
Figure 4B:
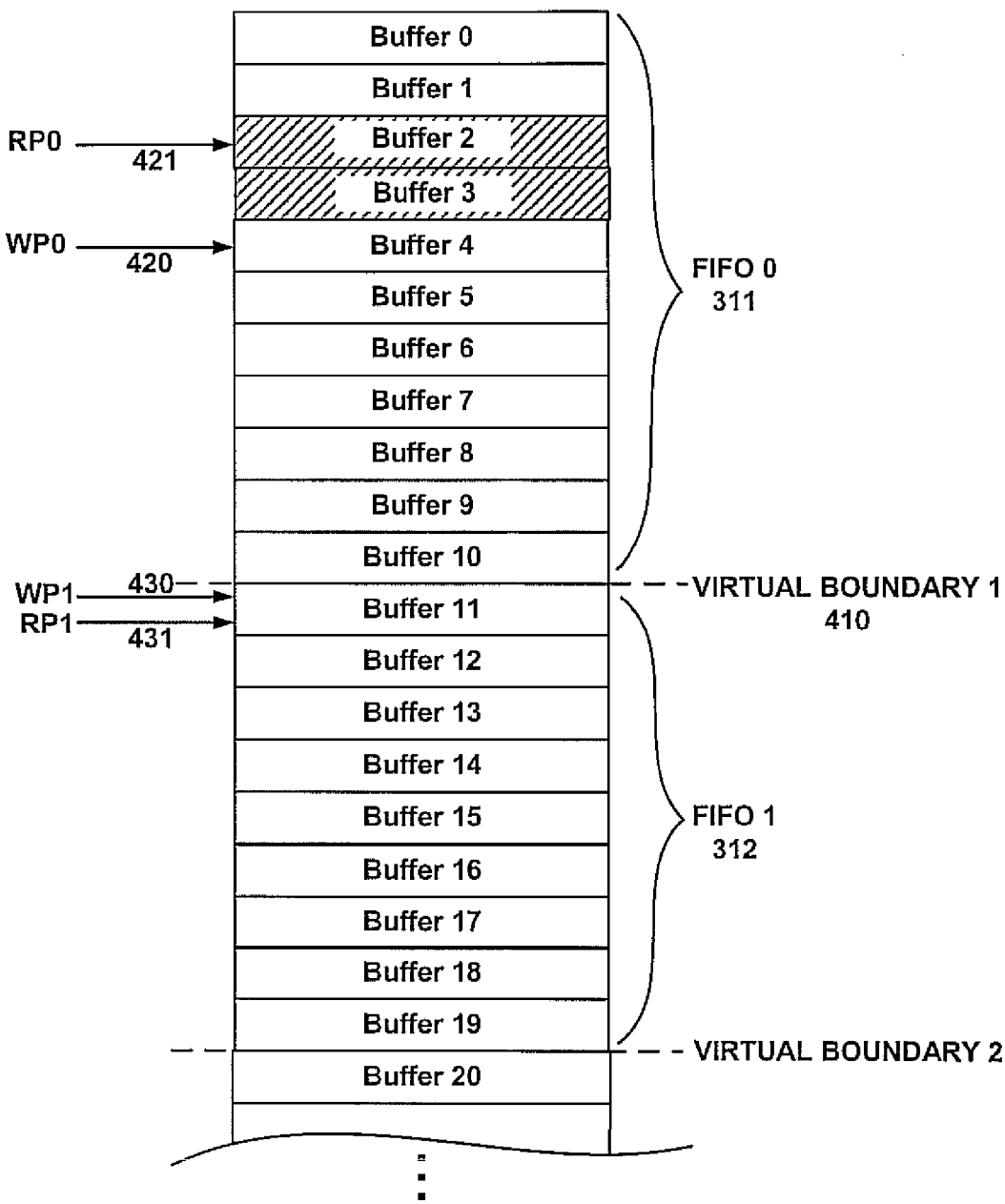

As described above with reference to FIG. 2B, control component 320 analyzes the state of the FIFO queues adjacent to the virtual boundary that is to be shifted to determine whether data integrity and synchronization between read and write functions will be maintained if the virtual boundary is shifted. For clarity, the following explanation will also refer to FIGS. 4A and 4B which show the allocation of memory resources of an exemplary memory device 310 in accordance with embodiments of the present invention. FIG. 4A shows the allocation of resources in memory device 310 prior to shifting a virtual boundary (e.g., 410 of FIGS. 4A and 4B), while FIG. 4B shows the allocation of memory resources after virtual boundary 410 has been shifted. An exemplary set of rules for determining whether a virtual boundary between, for example, FIFO 0 and FIFO 1 (e.g., 311 and 312 respectively of FIGS. 4A and 4B) can be incremented (e.g., increase FIFO 0) is shown below. These are evaluated by the control component (e.g., 320):

$WP0 > RP0$ $WP1 > RP1$ $RP1 > VB1$ $VB1+1 < VB2$

In the above example, the first rule, $WP0 > RP0$, determines whether the write pointer of FIFO 0 (WP0) (e.g., 420 of FIGS. 4A and 4B) is indexed at a higher value than the read pointer (RP0) of FIFO 0 (e.g., 421 of FIGS. 4A and 4B). In embodiments of the present invention, control component 320 accesses the values of WP0 and RP0 via coupling 340. As described above, the read and write pointers refer to a stored value that indicates the next data buffer to which data will be written, or from which data will be read for a given FIFO queue. In embodiments of the present invention, comparing these two values is a routine mathematical operation can be performed in a single clock cycle by, for example, control component 320. Analyzing whether $WP0 > RP0$ helps determine whether FIFO 0 is already full or wrapped. Similarly, analyzing whether $WP1 > RP1$ (e.g., 430 and 431 respectively of FIGS. 4A and 4B) helps determine whether FIFO 1 is already full or wrapped. If either of FIFO 0 or FIFO 1 is full or wrapped, then the data buffer of that FIFO which is adjacent to the virtual boundary contains current data. In embodiments of the present invention, if a data buffer of either of the FIFO queues adjacent to the virtual boundary that is to be shifted contains current data, then the attempt to shift the virtual boundary has failed. In embodiments of the present invention, control component 320 will not attempt to shift the virtual boundary again until after the counter(s) of the FIFO(s) are again accessed as described above.

It is noted that in some cases, WP0 (420) may equal RP0 (421) and/or WP1 (430) may equal RP1 (431). This may occur when data has not been written to a particular FIFO queue, or all of the data written to that FIFO queue has been read. Alternatively, it may indicate that the FIFO queue is full of current data because the write pointer for that FIFO has completed a cycle through the data buffers. In embodiments of the present invention, if the read pointer and the write pointer for a particular FIFO are equal, control component 320 will then determine whether the last action for that FIFO was a data read or a data write. If the last action was a data write, it indicates that the FIFO is full of current data and the attempt to shift the virtual boundary has failed as described above. If the last action performed was a data read, it indicates that the FIFO is no longer full of current data and that shifting the virtual boundary is still permitted.

The rule of $RP1 \geq VB1$ is used to prevent shifting the virtual boundary when the buffer of FIFO 1 that is adjacent to virtual boundary 1 (e.g., buffer 10) contains current data. Referring now to FIG. 4A, it is noted that both WP1 (430) and RP1 (431) are both indexed at 10, as is virtual boundary 1. In embodiments of the present invention, this condition may not prevent shifting virtual boundary 1 because buffer 10 does not contain current data. Instead, embodiments of the present invention may simply increment the index of both WP1 (430) and RP1 (431) prior to shifting virtual boundary 1.

Finally, the rule $VB1+1 < VB2$ is used to ensure that after virtual boundary 1 is shifted, at least one data buffer remains usable in FIFO 1. This prevents the existence of a named FIFO queue which comprises no data buffers. It is noted that the above rules or conditions are used to determine whether the index value of virtual boundary 1 can be incremented, thus increasing the size of FIFO 0 by one buffer (e.g., buffer 10). However, it is noted that in embodiments of the present invention, rules or conditions may be used to determine whether the index value of virtual boundary 1 can be decremented, thus increasing the size of FIFO 1 by one buffer (e.g., buffer 9). An exemplary set of rules for determining whether a virtual boundary between, for example, FIFO 0 and FIFO 1 (e.g., 311 and 312 respectively of FIGS. 4A and 4B) can be decremented (e.g., decrease FIFO 0) is shown below:

$WP0 > RP0$ $WP1 > RP1$ $WP0 > VB1-1$ $VB1 > 1$

In the above set of rules, the first two rules are similar to those described above. The rule $WP0 > VB1-1$, is used to prevent shifting the virtual boundary when the buffer of FIFO 0 that is adjacent to virtual boundary 1 (e.g., buffer 9) contains current data. The rule VB1>1 is used to ensure that after virtual boundary 1 is shifted, that FIFO 0 will still comprise at least one data buffer.

With reference now to FIG. 4A, it is noted that the conditions WP0>RP0 and WP1>RP1 are both met. Additionally, while the condition RP1>VB1 is not met, it is noted that buffer 10 does not contain current data. As a result, the index for RP1 (431), as well as WP1 (430) can be incremented prior to shifting virtual boundary 1 without compromising data or adversely affect the synchronization of writing to and reading from FIFO 1 (312). Finally, the condition VB1+1<VB2 is met because if the index for virtual boundary 1 is incremented by 1 (e.g., to 11), this is still greater than the index for virtual boundary 2 (e.g., 20), thus indicating that FIFO 1 (312) will comprise at least one data buffer after a shift of virtual boundary 1.

FIG. 4B shows the FIFO queues of memory device 310 after shifting virtual boundary 1 (410) in accordance with embodiments of the present invention. As shown in FIG. 4B, the index of virtual boundary 1 (410) has been indexed by one. As a result, the boundary between FIFO 0 (311) and FIFO 1 (312) has been shifted so that FIFO 0 now includes buffer 10. Again, it is noted that in embodiments of the present invention, a shift of more than one data buffer may be implemented in embodiments of the present invention. In embodiments of the present invention, after shifting the boundary between two FIFO queues, the counters associated with those FIFO queues are re-set to facilitate determining whether additional changes of the FIFO boundaries may be desirable.

Figure 5A:
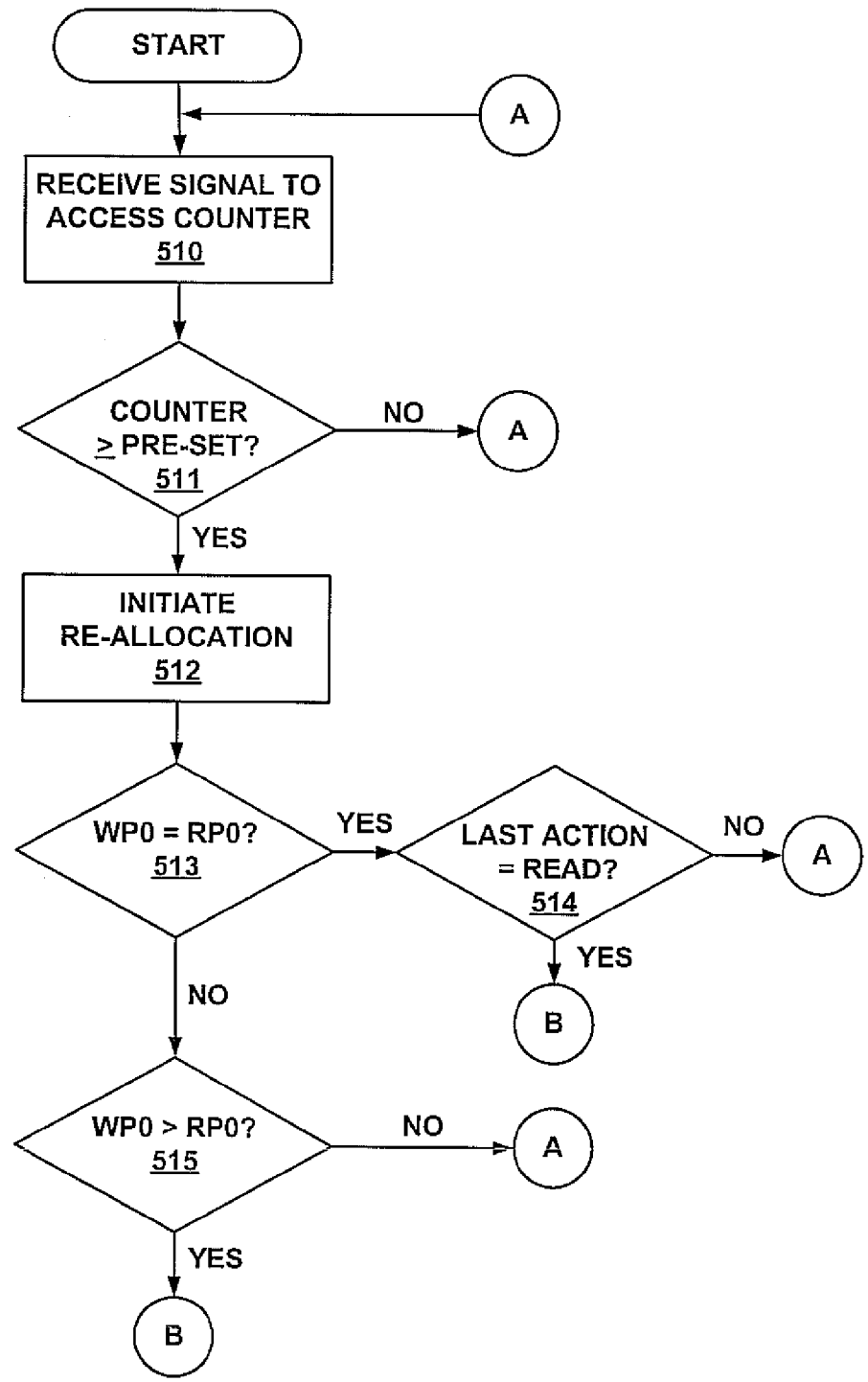
FIGS. 5A, 5B, and 5C are a flowchart of a method for automatically allocating memory resources in accordance with an embodiment of the present invention.
Figure 5B:
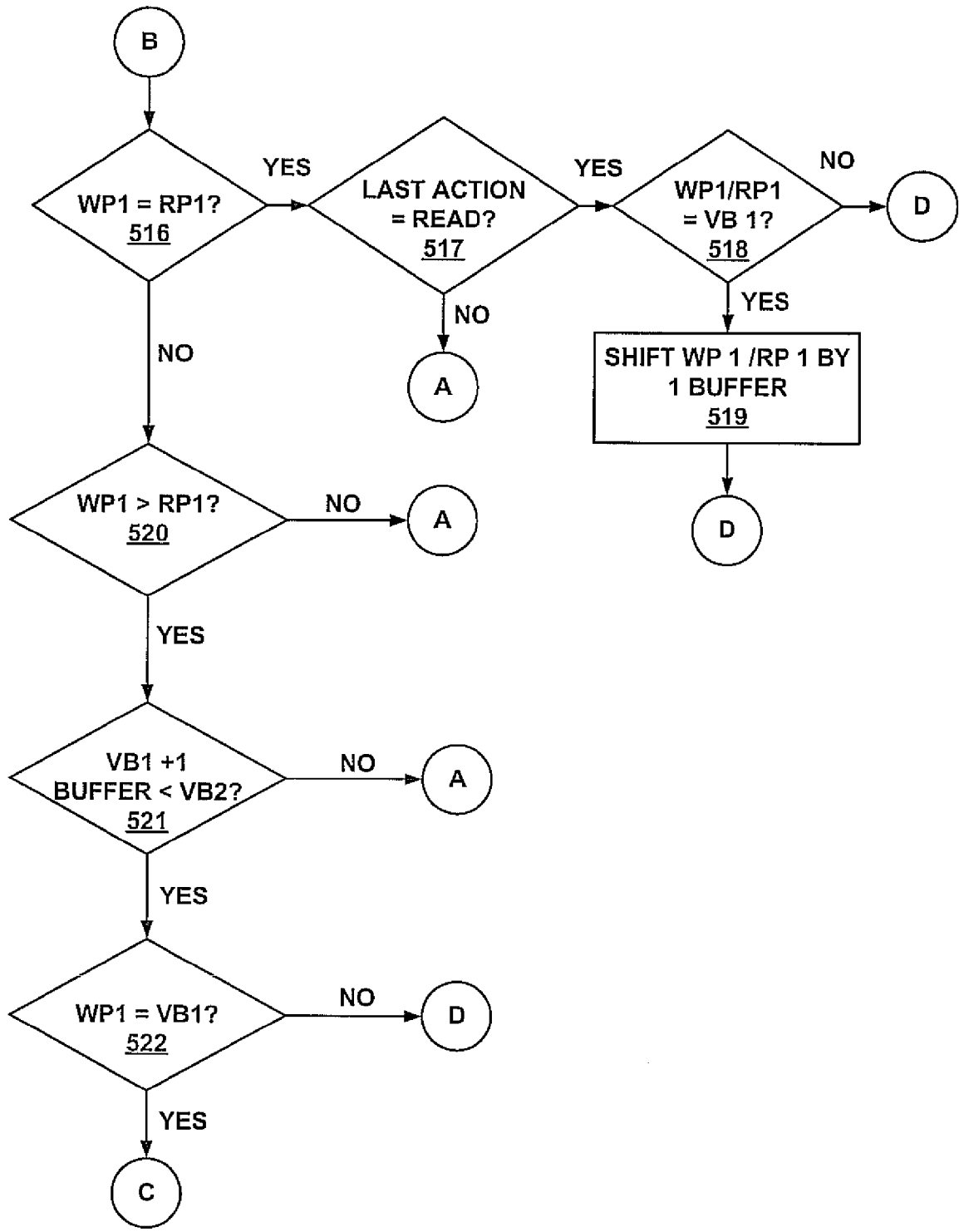
Figure 5C:
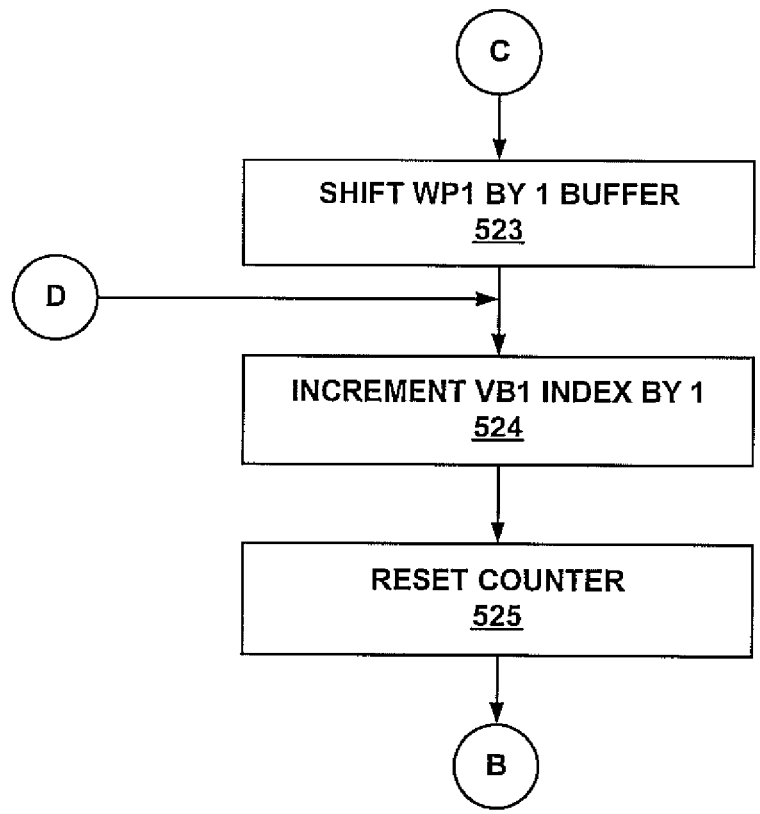

FIGS. 5A, 5B, and 5C are a flowchart of a computer implemented method 500 for allocating memory resources in accordance with an embodiment of the present invention. It is noted that for the sake of greater clarity, reference to FIG. 4A will be made in the following discussion. In embodiments of the present invention, process 500 may be implemented on control component 320. Furthermore, in the following discussion, the shifting of the virtual boundary refers to incrementing the index value of virtual boundary 410 of FIG. 4A in order to increase FIFO 0. In step 510 of FIG. 5A, a signal is received to access the counter of a FIFO queue. In embodiments of the present invention, control component 320 periodically generates a command (e.g., via 330) to access the counter (e.g., 311a) of a FIFO queue (e.g., 311). Method 500 then proceeds to step 511. It is appreciated that process 500 may be operable to process in parallel, respectively, the counter of each FIFO separately, The example of FIFO 0/FIFO 1 is shown for clarity.

In step 511 of FIG. 5A, logical operation is performed to determine whether the value accessed from the counter in step 510 is equal to, or greater than a pre-set value. In embodiments of the present invention, control component 320 compares the value accessed from the counter (e.g., 311a) with a pre-set value. If the value accessed from the counter is equal to, or greater than, the pre-set value, method 500 proceeds to step 512. If the value accessed from the counter is less than the pre-set value, method 500 terminates without boundary adjustment and returns step 510.

In step 512 of FIG. 5A, a signal is generated to initiate a re-allocation of memory resources. Based on the comparison performed in step 511 above, control component 320 initiates an algorithm as described above with reference to FIGS. 2B and 3 in order to allocate additional memory resources to the FIFO queue which is generating excessive write denials. Method 500 then proceeds to step 513.

In step 513 of FIG. 5A, a logical operation is performed to determine whether write pointer 0 (WP0) is equal to read pointer 0 (RP0). As described above, embodiments of the present invention analyze the state of the FIFOs adjacent to the boundary that is to be shifted. In so doing, it is determined whether shifting the boundary is likely to result in lost data, or a de-synchronization of read and write functions in one or more FIFO queues. With reference again to FIG. 4A, a comparison of the index values of the write pointer and read pointer of FIFO 0 is made to determine if they are equal. If the read pointer and the write pointer of FIFO 0 are equal, method 500 proceeds to step 514. If the read pointer and the write pointer of FIFO 0 are not equal, method 500 proceeds to step 515.

In step 514 of FIG. 5A, a logical operation is performed to determine whether the last action performed by FIFO 0 was a read operation. If the read pointer and write pointers of FIFO 0 are indexed to the same value, control component 320 then determines whether the last operation performed by FIFO 0 was a read operation or a write operation. If the last operation of FIFO 0 was a write operation, thus indicating that FIFO 0 is full of current data, method 500 terminates without boundary adjustment and returns to step 510. If the last operation of FIFO 0 was a read operation, thus indicating that FIFO 0 is empty, method 500 proceeds to step 516.

In step 515 of FIG. 5A, a logical operation is performed to determine whether WP0 is equal to RP0. If the index value for the write pointer of FIFO 0 is greater than the index value of the read pointer, this indicates that FIFO 0 is not wrapped and is therefore still eligible for shifting the virtual border with FIFO 1. As a result, method 500 proceeds to step 516. If the read pointer of FIFO 0 is greater than the index value of the write pointer of FIFO 0, this indicates that FIFO 0 is wrapped and therefore ineligible for shifting the virtual border it shares with FIFO 1. As a result, method 500 returns to step 510.

In step 516 of FIG. 5B, a logical operation is performed to determine whether write pointer 1 (WP1) is equal to read pointer 1 (RP1). As with step 513, step 516 may help determine whether FIFO 1 is empty, full or wrapped. If WP1 is equal to RP1, method 500 proceeds to step 517. If WP1 is not equal to RP1, method 500 proceeds to step 520.

In step 517 of FIG. 5B, a logical operation is performed to determine whether the last operation performed by FIFO 1 was a read operation. As described above with reference to step 514, step 517 determines whether FIFO 1 is empty or full. If the last operation performed by FIFO 1 was a write action, this indicates that FIFO 1 is full and method 500 proceeds to step 510. If the last operation performed by FIFO 1 was a read action, this indicates that FIFO 1 is empty and method 500 proceeds to step 518.

In step 518 of FIG. 5B, a logical operation is performed to determine whether WP1 and RP1 are equal to the index value of virtual boundary 1 (VB1). If the index values of both WP1 and RP1 are equal to the index value of virtual boundary 1, they will have to be incremented prior to shifting virtual boundary 1. Otherwise, the read pointer and write pointer for FIFO 1 will be indexed to a data buffer that is now a part of FIFO 0. In embodiments of the present invention, if the index values of WP1 and RP1 are equal to the index value of virtual boundary 1, method 500 proceeds to step 519.

In step 519 of FIG. 5B, WP1 and RP1 are shifted by one buffer and method 500 proceeds to step 524.

In step 520 of FIG. 5B, a logical operation is performed to determine whether WP1 is greater than RP1. As described above with reference to step 515, step 520 indicates whether FIFO 1 is wrapped. If WP1 is greater than RP1, this indicates that FIFO 1 is not wrapped and method 500 proceeds to step

521. If WP1 is less than RP1, this indicates that FIFO 1 is wrapped and method 500 returns to step 510.

In step 521 of FIG. 5B, a logical operation is performed to determine whether the FIFO 1 will comprise at least one data buffer after VB1 is shifted. If the index value of virtual boundary 1 can be incremented by 1 and still be greater than the index value of virtual boundary 2, this indicates that FIFO 1 will still comprise at least one data buffer after virtual boundary 1 is shifted. If this condition is true, method 500 proceeds to step 522. If this condition is not true, method 500 returns to step 510.

In step 522 of FIG. 5B, a logical operation is performed to determine whether WP1 is equal to VB1. If the index value of WP1, and not RP1, is equal to the index value of VB1, this indicates that the index value of WP1 will have to be incremented prior to shifting virtual boundary 1. Thus, if this condition is true, method 500 proceeds to step 523. If this condition is not true, method 500 proceeds to step 524.

In step 523 of FIG. 5C, WP1 is shifted by one data buffer. This prevents the write pointer of FIFO 1 from indicating a write to a data buffer that will be a part of FIFO 0 after virtual boundary 1 is shifted. Method 500 then proceeds to step 524.

In step 524 of FIG. 5C, the index of VB1 is incremented by one. By incrementing the index value of virtual boundary 1, FIFO 0 gains a data buffer at the expense of FIFO 1. Thus, a greater amount of memory is available to FIFO 0 which may reduce the frequency of write denials to FIFO 0. Method 500 then proceeds to step 525.

In step 525 of FIG. 5C, the counter for FIFO 0 is reset. In embodiments of the present invention, this facilitates determining whether shifting the virtual boundary between FIFO 0 and FIFO 1 has adequately addressed the issue of write denials generated by FIFO 0. In embodiments of the present invention, the counters of both FIFO 0 and FIFO 1 are reset after the virtual boundary between them has been shifted. Method 500 then returns to step 510.

Figure 6A:
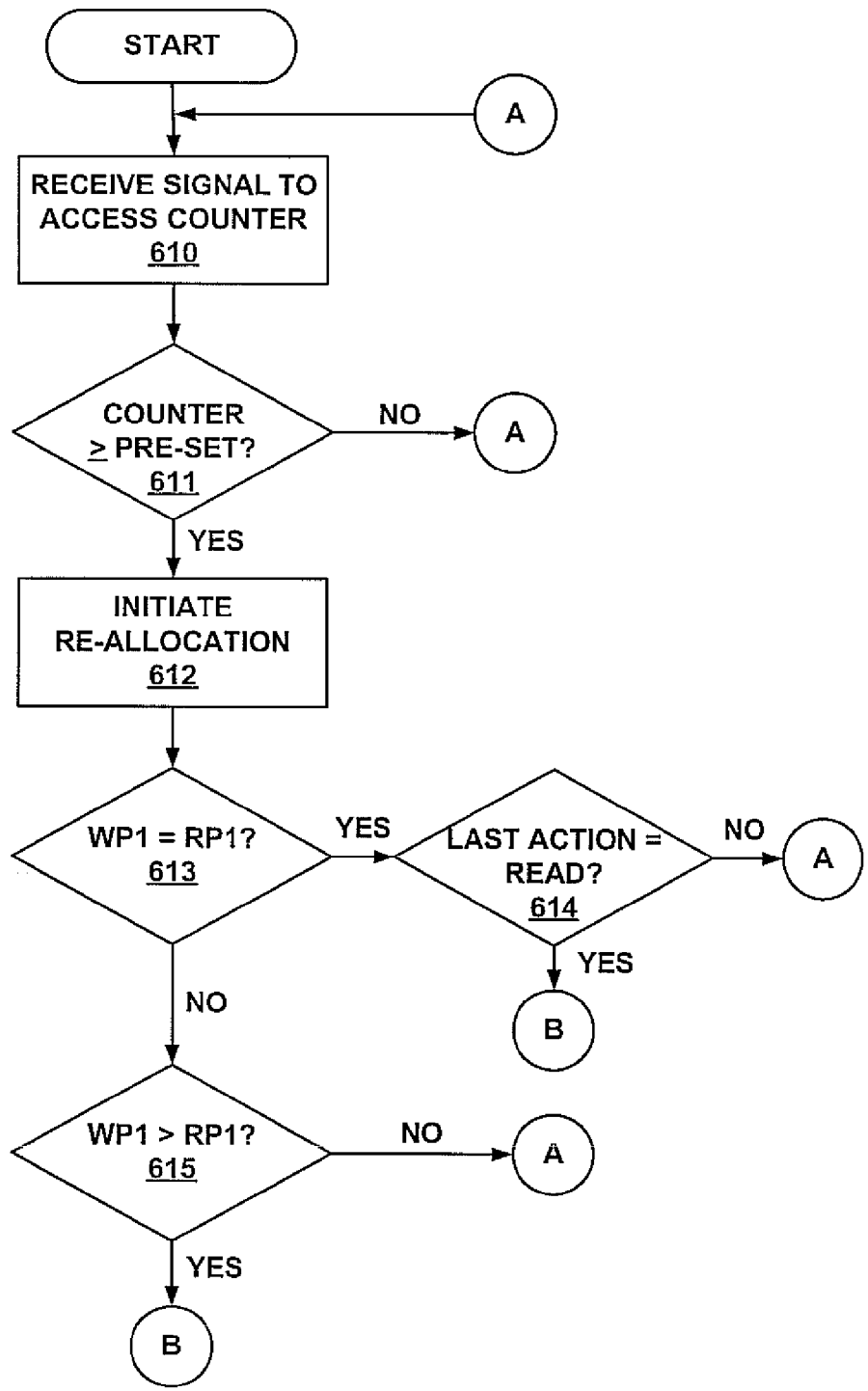
FIGS. 6A, 6B, and 6C are a flowchart of another method for automatically allocating memory resources in accordance with an embodiment of the present invention.
Figure 6B:
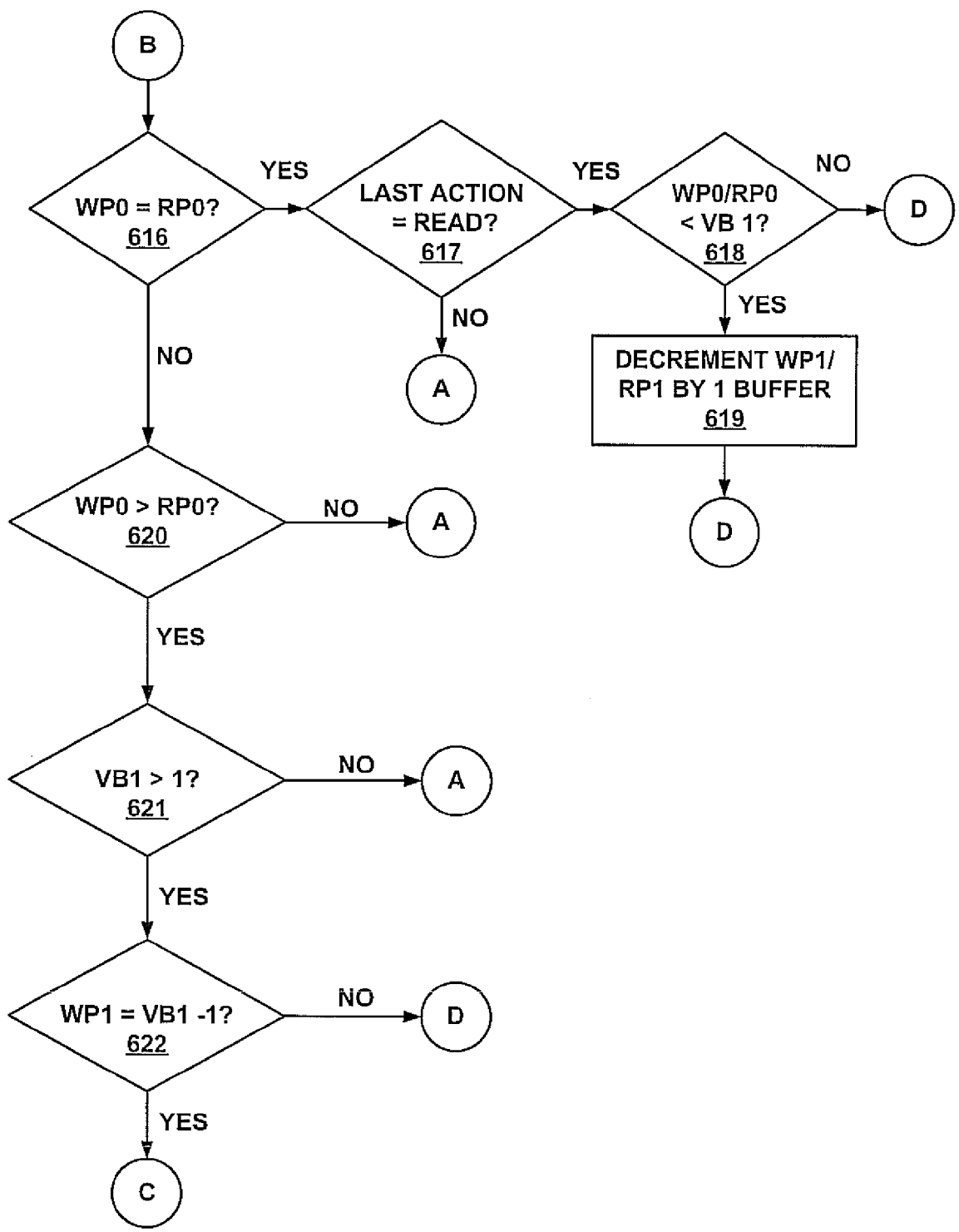
Figure 6C:
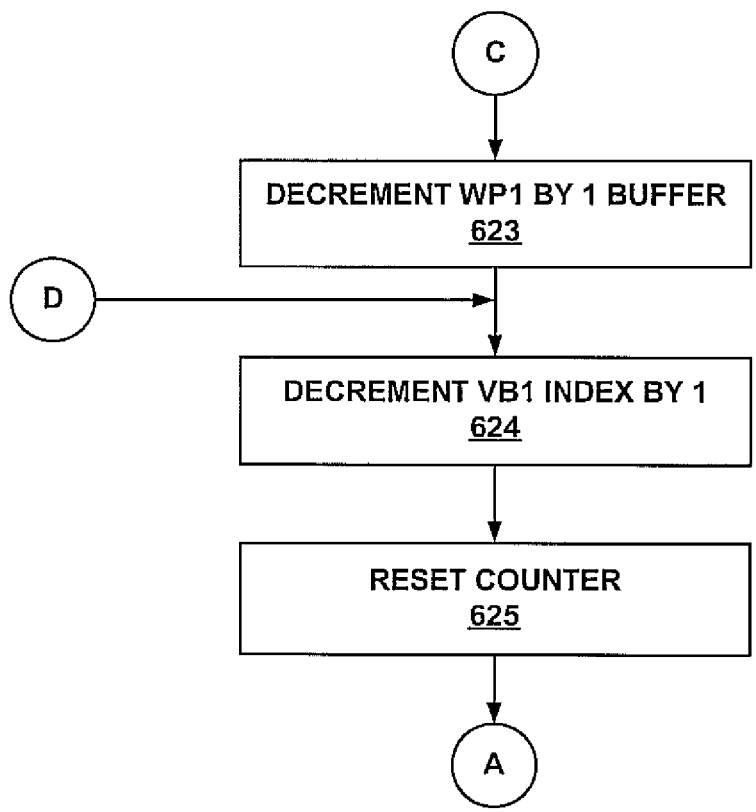

FIGS. 6A, 6B, and 6C are a flowchart of another method 600 for allocating memory resources in accordance with an embodiment of the present invention. In embodiments of the present invention, process 600 may be implemented by control component 320. Again, FIG. 4A will be referenced for greater clarity. In the following discussion, the shifting of the virtual boundary refers to decrementing the index value of virtual boundary 410 of FIG. 4A in order to increase FIFO 1. In step 610 of FIG. 6A, a signal is received to access the counter of a FIFO queue. In embodiments of the present invention, control component 320 periodically generates a command (e.g., via 330) to access the counter (e.g., 312a) of a FIFO queue (e.g., 312) to determine whether excessive write denials are taking place with reference to FIFO 1.

In step 611 of FIG. 6A, logical operation is performed to determine whether the value accessed from the counter in step 610 is equal to, or greater than a pre-set value. In embodiments of the present invention, control component 320 compares the value accessed from the counter (e.g., 312a) with a pre-set value. If the value accessed from the counter is equal to, or greater than, the pre-set value, method 600 proceeds to step 612. If the value accessed from the counter is less than the pre-set value, method 600 returns step 610.

In step 612 of FIG. 6A, a signal is generated to initiate a re-allocation of memory resources. Based on the comparison performed in step 611 above, control component 320 initiates an algorithm as described above with reference to FIGS. 2 and 3 in order to allocate additional memory resources to FIFO 1 queue which is indicating excessive write denials. Method 600 then proceeds to step 613.

In step 613 of FIG. 6A, a logical operation is performed to determine whether write pointer 1 (WP1) is equal to read pointer 1 (RP1). As described above, embodiments of the present invention analyze the state of the FIFOs adjacent to the boundary that is to be shifted. In so doing, it is determined whether shifting the boundary is likely to result in lost data, or a de-synchronization of read and write functions in one or more FIFO queues. With reference again to FIG. 4A, a simple comparison of the index values of the write pointer and read pointer of FIFO 1 is made to determine if they are equal. If the read pointer and the write pointer of FIFO 1 are equal, method 600 proceeds to step 614. If the read pointer and the write pointer of FIFO 1 are not equal, method 600 proceeds to step 615.

In step 614 of FIG. 6A, a logical operation is performed to determine whether the last action performed by FIFO 1 was a read operation. If the read pointer and write pointers of FIFO 1 are indexed to the same value, control component 320 then determines whether the last operation performed by FIFO 1 was a read operation or a write operation. If the last operation of FIFO 1 was a write operation, thus indicating that FIFO 1 is full of current data, method 600 returns to step 610. If the last operation of FIFO 1 was a read operation, thus indicating that FIFO 1 is empty, method 600 proceeds to step 616.

In step 615 of FIG. 6A, a logical operation is performed to determine whether WP1 is greater than RP1. If the index value for the write pointer of FIFO 1 is greater than the index value of the read pointer, this indicates that FIFO 1 is not wrapped and is therefore still eligible for shifting the virtual border with FIFO 0. As a result, method 600 proceeds to step 616. If the read pointer of FIFO 1 is greater than the index value of the write pointer of FIFO 1, this indicates that FIFO 1 is wrapped and therefore ineligible for shifting the virtual border it shares with FIFO 1. As a result, method 600 returns to step 610.

In step 616 of FIG. 6B, a logical operation is performed to determine whether write pointer 0 (WP0) is equal to read pointer 0 (RP0). As with step 613, step 616 may help determine whether FIFO 0 is empty, full or wrapped. If WP0 is equal to RP0, method 600 proceeds to step 617. If WP0 is not equal to RP 0, method 600 proceeds to step 620.

In step 617 of FIG. 6B, a logical operation is performed to determine whether the last operation performed by FIFO 0 was a read operation. As described above with reference to step 614, step 617 determines whether FIFO 0 is empty or full. If the last operation performed by FIFO 0 was a write action, this indicates that FIFO 0 is full and method 600 returns to step 610. If the last operation performed by FIFO 0 was a read action, this indicates that FIFO 0 is empty and method 600 proceeds to step 618.

In step 618 of FIG. 6B, a logical operation is performed to determine whether WP0 and RP0 are less than the index value of virtual boundary 1 (VB1) minus 1. If the index values of both WP1 and RP1 are less than the index value of virtual boundary 1 minus 1, they will have to be incremented prior to shifting virtual boundary 1. Otherwise, the read pointer and write pointer for FIFO 0 will be indexed to a data buffer that is now a part of FIFO 1. In embodiments of the present invention, if the index values of WP0 and RP0 are not less than the index value of virtual boundary 1 minus 1, method 600 proceeds to step 619. If the index values are less than the index value of virtual boundary 1 minus 1, method 600 proceeds to step 624.

In step 619 of FIG. 6B, WP1 and RP1 are decremented by one buffer and method 600 proceeds to step 624.

In step 620 of FIG. 6B, a logical operation is performed to determine whether WP0 is greater than RP0. As described above with reference to step 615, step 620 indicates whether FIFO 0 is wrapped. If WP0 is greater than RP0, this indicates that FIFO 0 is not wrapped and method 600 proceeds to step 621. If WP0 is less than RP0, this indicates that FIFO 0 is wrapped and method 600 returns to step 610.

In step 621 of FIG. 6B, a logical operation is performed to determine whether the FIFO 0 will comprise at least one data buffer after VB1 is shifted. If the index value of virtual boundary 1 is greater than 1, this indicates that FIFO 0 will still comprise at least one data buffer after virtual boundary 1 is shifted. If this condition is true, method 600 proceeds to step 622. If this condition is not true, method 600 returns to step 610.

In step 622 of FIG. 6B, a logical operation is performed to determine whether WP1 is equal to VB1 minus 1. If the index value of WP1, and not RP1, is equal to the index value of VB1 minus 1, this indicates that the index value of WP1 will have to be decremented prior to shifting virtual boundary 1. Thus, if this condition is true, method 600 proceeds to step 623. If this condition is not true, method 600 proceeds to step 624.

In step 623 of FIG. 6C, WP1 is decremented by one data buffer. This prevents the write pointer of FIFO 0 from indicating a write to a data buffer that will be a part of FIFO 1 after virtual boundary 1 is shifted. Method 600 then proceeds to step 624.

In step 624 of FIG. 6C, the index of VB1 is decremented by one. By decrementing the index value of virtual boundary 1, FIFO 1 gains a data buffer at the expense of FIFO 0. Thus, a greater amount of memory is available to FIFO 1 which may reduce the frequency of write denials to FIFO 1. Method 600 then proceeds to step 625.

In step 625 of FIG. 6C, the counter for FIFO 1 is reset. In embodiments of the present invention, this facilitates determining whether shifting the virtual boundary between FIFO 0 and FIFO 1 has adequately addressed the issue of write denials generated by FIFO 1. In embodiments of the present invention, the counters of both FIFO 0 and FIFO 1 are reset after the virtual boundary between them has been shifted. Method 600 then returns to step 610.

The preferred embodiment of the present invention, automatic resource sharing between FIFOs, is thus described. While the present invention has been described in particular embodiments, it should be appreciated that the present invention should not be construed as limited by such embodiments, but rather construed according to the following claims.

What is claimed is:

1. A method for automatically allocating memory resources, said method comprising:
   determining that a data buffer adjacent to a boundary of a first-in first-out (FIFO) queue does not contain current data;
   determining that a second data buffer of a second FIFO queue adjacent to said boundary does not contain current data; and
   in response to said determining and further based on a number of times that said FIFO queue has been full, automatically shifting said boundary to include said second data buffer in said FIFO queue.

2. The method as recited in claim 1 wherein said automatically shifting further comprises:
   determining that said FIFO queue is not wrapped; and
   determining that said second FIFO is not wrapped.

3. The method as recited in claim 1 wherein said determining that said data buffer and said second data buffer do not contain current data further comprises:
   determining that at least one of said FIFO queue and said second FIFO queue are empty.

4. The method as recited in claim 1 further comprising:
   determining that said second FIFO queue will comprise at least one data buffer after said automatically shifting said boundary.

5. The method as recited in claim 1 further comprising:
   shifting at least one of a read pointer and a write pointer from said second data buffer to a third data buffer of said second FIFO queue.

6. The method as recited in claim 1 further comprising:
   using a counter to record the number of times that said FIFO queue being filled; and
   generating a signal to initiate said automatically shifting said boundary in response to said counter exceeding a threshold.

7. The method as recited in claim 6 further comprising:
   re-setting said counter after said automatically shifting said border.

8. A method for automatically allocating memory resources, said method comprising:
   receiving a signal for initiating an automatic shifting of a border between a first first-in first-out (FIFO) queue and a second FIFO queue adjacent to said FIFO queue;
   determining that a data buffer adjacent to a boundary of said first (FIFO) queue does not contain current data in response to said signal;
   determining that a second data buffer of a second FIFO queue adjacent to said boundary does not contain current data in response to said signal; and
   automatically shifting said boundary to include said second data buffer in said first FIFO queue in response to said determining and further based on a number of times that said first FIFO queue has been full.

9. The method as recited in claim 8 further comprising:
   accessing a counter which records the number of times that said first FIFO queue being filled;
   comparing a value stored by said counter with a pre-determined parameter; and
   generating said signal when said counter value is at least equal to said pre-determined parameter.

10. The method as recited in claim 9 further comprising:
    creating a time parameter for automatically accessing said counter;
    determining that said counter saturates at least once; and
    automatically decreasing said time parameter.

11. The method as recited in claim 9 further comprising:
    re-setting said counter after said automatically shifting said boundary.

12. The method as recited in claim 8 further comprising:
    determining that said second FIFO queue will comprise at least one data buffer after automatically shifting said boundary.

13. The method as recited in claim 8 further comprising:
    shifting at least one of a read pointer and a write pointer from said second data buffer to a third data buffer of said second FIFO queue.

14. A system comprising:
    a memory device comprising a plurality of adjacent first-in first-out (FIFO) queues separated by respective boundaries;
    a control component coupled with said memory device for determining that a data buffer adjacent to a boundary of a first FIFO queue does not contain current data and that a second data buffer of a second FIFO queue adjacent to said boundary does not contain current data, said control component further for automatically shifting said boundary to include said second data buffer in said first FIFO queue when a number of times that said first FIFO queue has been full exceeds a threshold value.

15. The system of claim 14 wherein said control component is further for determining that said second FIFO queue will comprise at least one data buffer after said automatically shifting said boundary.

16. The system of claim 14 wherein said control component is further for shifting at least one of a read pointer and a write pointer from said second data buffer to a third data buffer of said second FIFO queue.

17. The system of claim 14 wherein said control component further comprises at least one counter associated with said first FIFO queue, said counter for automatically incrementing when said first FIFO queue is filled.

18. The system of claim 17 wherein said control component initiates said automatically shifting said border in response to comparing a value stored by said counter with a pre-determined parameter.

19. The system of claim 14 further comprising a plurality of counters respectively associated with a plurality of FIFO queues.

20. A method of dynamically allocating memory resources between memory spaces, said method comprising:
   recording values indicative of usage of each FIFO queue of a plurality of FIFO queues comprising a first FIFO queue and an adjacent second FIFO queue, wherein said usage comprises a number of times that said plurality of FIFO queues has been full; and
   based on a usage value associated with said first FIFO queue exceeding a threshold value, automatically performing a first buffer reallocation between said first FIFO queue and said second FIFO queue provided a plurality of first conditions are satisfied and wherein said first buffer reallocation increases said first FIFO and decreases said second FIFO.

21. A method as described in claim 20 wherein said plurality of first conditions comprise:
   a determination that buffers adjacent to a boundary between said first and second FIFO queues are empty; and
   a determination that said first FIFO and said second FIFO are not in a state of wrap-around.

22. A method as described in claim 20 wherein said performing a first buffer reallocation comprises incrementing a boundary separating said first and second FIFO queues.

23. A method as described in claim 20 further comprising based on a usage value associated with said second FIFO queue exceeding a threshold value, automatically performing a second buffer reallocation between said first FIFO queue and said second FIFO queue provided a plurality of second conditions are satisfied and wherein said second buffer reallocation increases said second FIFO and decreases said first FIFO.

24. A method as described in claim 23 wherein said plurality of second conditions comprise:
   a determination that buffers adjacent to a boundary between said first and second FIFO queues are empty; and
   a determination that said first FIFO and said second FIFO are not in a state of wrap-around.

25. A method as described in claim 23 wherein said performing said second buffer reallocation comprises decrementing a boundary separating said first and second FIFO queues.

26. A method as described in claim 20 wherein said recording values indicative of usage comprises updating a counter associated with said first FIFO queue in response to said first FIFO queue being full wherein said counter comprises a usage value.

27. A method as described in claim 26 wherein said recording values indicative of usage further comprises updating a second counter associated with said second FIFO queue in response to said second FIFO queue being full wherein said second counter comprises a usage value.

* * * * *